United States Patent
Chiang et al.

(10) Patent No.: US 10,684,357 B2
(45) Date of Patent: Jun. 16, 2020

(54) VEHICLE DETECTION ASSISTING METHOD AND VEHICLE DETECTION ASSISTING SYSTEM

(71) Applicant: INSTITUTE FOR INFORMATION INDUSTRY, Taipei (TW)

(72) Inventors: Hsin-Han Chiang, Taipei (TW); Yen-Lin Chen, Taipei (TW); Chien Lin, New Taipei (TW); Chao-Wei Yu, Jiadong Township (TW); Meng-Tsan Li, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 156 days.

(21) Appl. No.: 15/787,535

(22) Filed: Oct. 18, 2017

(65) Prior Publication Data
US 2019/0064322 A1 Feb. 28, 2019

(30) Foreign Application Priority Data
Aug. 25, 2017 (TW) .............................. 106129051 A

(51) Int. Cl.
| G01S 7/48 | (2006.01) |
| G01S 17/08 | (2006.01) |
| G01S 17/42 | (2006.01) |
| G01S 17/86 | (2020.01) |
| G01S 17/931 | (2020.01) |
| G01S 17/04 | (2020.01) |

(52) U.S. Cl.
CPC .......... *G01S 7/4802* (2013.01); *G01S 7/4806* (2013.01); *G01S 7/4808* (2013.01); *G01S 17/04* (2020.01); *G01S 17/08* (2013.01); *G01S 17/42* (2013.01); *G01S 17/86* (2020.01); *G01S 17/931* (2020.01)

(58) Field of Classification Search
CPC ...... G01S 7/4802; G01S 17/023; G01S 17/08; G01S 17/42; G01S 17/936; G01S 17/04; G01S 17/931; G01S 7/4808; G01S 7/4806
See application file for complete search history.

(56) References Cited

U.S. PATENT DOCUMENTS

| 6,311,119 B2 * | 10/2001 | Sawamoto ......... B60K 31/0008 |
| | | 701/96 |
| 6,489,887 B2 * | 12/2002 | Satoh ................... G05D 1/0246 |
| | | 340/435 |

(Continued)

FOREIGN PATENT DOCUMENTS

CN   105403893 A   3/2016

OTHER PUBLICATIONS

Asvadi et al., "3D Lidar-based static and moving obstacle detection in driving environments: An approach based on voxels and multi-region ground planes", Robotics and Autonomous Systems 83 (2016), pp. 299-311.

*Primary Examiner* — Nicholas Kiswanto
(74) *Attorney, Agent, or Firm* — Birch, Stewart, Kolasch & Birch, LLP

(57) ABSTRACT

A vehicle detecting detection assisting method and a vehicle detection assisting system are provided. The vehicle detection assisting method includes the following steps. A scanning range of a lidar unit is obtained. A width of a lane is obtained. A trace of the lane is obtained. A dynamic region of interest in the scanning range is created according to the width and the trace.

18 Claims, 10 Drawing Sheets

(56) References Cited

U.S. PATENT DOCUMENTS

| | | | | |
|---|---|---|---|---|
| 6,691,018 | B1* | 2/2004 | Miyahara | B60W 30/16 |
| | | | | 701/96 |
| 8,224,550 | B2* | 7/2012 | Kudo | B62D 15/025 |
| | | | | 180/170 |
| 9,061,590 | B2* | 6/2015 | Kurumisawa | B60K 31/00 |
| 9,428,187 | B2* | 8/2016 | Lee | B60W 30/12 |
| 10,220,844 | B2* | 3/2019 | Ko | B60W 50/14 |
| 10,332,400 | B2* | 6/2019 | Oooka | G08G 1/161 |
| 2016/0325753 | A1* | 11/2016 | Stein | G06T 3/40 |
| 2016/0339959 | A1* | 11/2016 | Lee | G06K 9/00805 |
| 2017/0326981 | A1* | 11/2017 | Masui | G01S 13/931 |
| 2017/0356983 | A1* | 12/2017 | Jeong | G01S 7/4817 |
| 2018/0009438 | A1* | 1/2018 | Masui | B60W 30/14 |
| 2018/0189574 | A1* | 7/2018 | Brueckner | H04N 5/23235 |
| 2018/0306905 | A1* | 10/2018 | Kapusta | G01S 7/4808 |

\* cited by examiner

VEHICLE DETECTION ASSISTING METHOD AND VEHICLE DETECTION ASSISTING SYSTEM

This application claims the benefit of Taiwan application Serial No. 106129051, filed Aug. 25, 2017, the disclosure of which is incorporated by reference herein in its entirety.

TECHNICAL FIELD

The disclosure relates in general to a detection assisting method and a detection assisting system, and more particularly to a vehicle detection assisting method and a vehicle detection assisting system.

BACKGROUND

Driving safety is an important issue in vehicle industry. In the technology of vehicle, various security detection systems, such as Vision-Lidar Fusion, are invented for improving the driving safety. However, in the conventional technology, whole of the front range is detected even if the lane is curved. The curved lane often causes the detection of the vehicle error, which makes the traffic safety cannot be guaranteed.

SUMMARY

The disclosure is directed to a vehicle detection assisting method and a vehicle detection assisting system. A dynamic region of interest (dynamic ROI) is used to assist the vehicle detection. As such, even if the lane is curved, whether the vehicle drives on the lane and whether the vehicle leaves the lane can be correctly determined to improve the driving safety.

According to one embodiment, a vehicle detection assisting method is provided. The vehicle detection assisting method includes the following steps: A scanning range of a lidar unit is obtained. A width of a lane is obtained. A trace of the lane is obtained. A dynamic region of interest (dynamic ROI) in the scanning range is created according to the width and the trace.

According to another embodiment, a vehicle detection assisting system is provided. The vehicle detection assisting system includes a lidar unit, a width analyzing unit, a trace analyzing unit and a processing unit. The lidar unit is used for emitting a plurality of scanning lines. The lidar unit has a scanning range. The width analyzing unit is used for obtaining a width of a lane. The trace analyzing unit is used for obtaining a trace of the lane. The processing unit is used for creating a dynamic region of interest (dynamic ROI) in the scanning range according to the width and the trace.

FIG. 1 shows a block diagram of a vehicle detection assisting system.

BRIEF DESCRIPTION OF THE DRAWINGS

The disclosure is directed to a vehicle detection assisting method and a vehicle detection assisting system. A dynamic region of interest (dynamic ROI) is used to assist the vehicle detection. As such, even if the lane is curved, whether the vehicle drives on the lane and whether the vehicle leaves the lane can be correctly determined to improve the driving safety.

According to one embodiment, a vehicle detection assisting method is provided. The vehicle detection assisting method includes the following steps: A scanning range of a lidar unit is obtained. A width of a lane is obtained. A trace of the lane is obtained. A dynamic region of interest (dynamic ROI) in the scanning range is created according to the width and the trace.

According to another embodiment, a vehicle detection assisting system is provided. The vehicle detection assisting system includes a lidar unit, a width analyzing unit, a trace analyzing unit and a processing unit. The lidar unit is used for emitting a plurality of scanning lines. The lidar unit has a scanning range. The width analyzing unit is used for obtaining a width of a lane. The trace analyzing unit is used for obtaining a trace of the lane. The processing unit is used for creating a dynamic region of interest (dynamic ROI) in the scanning range according to the width and the trace.

Figure 1:
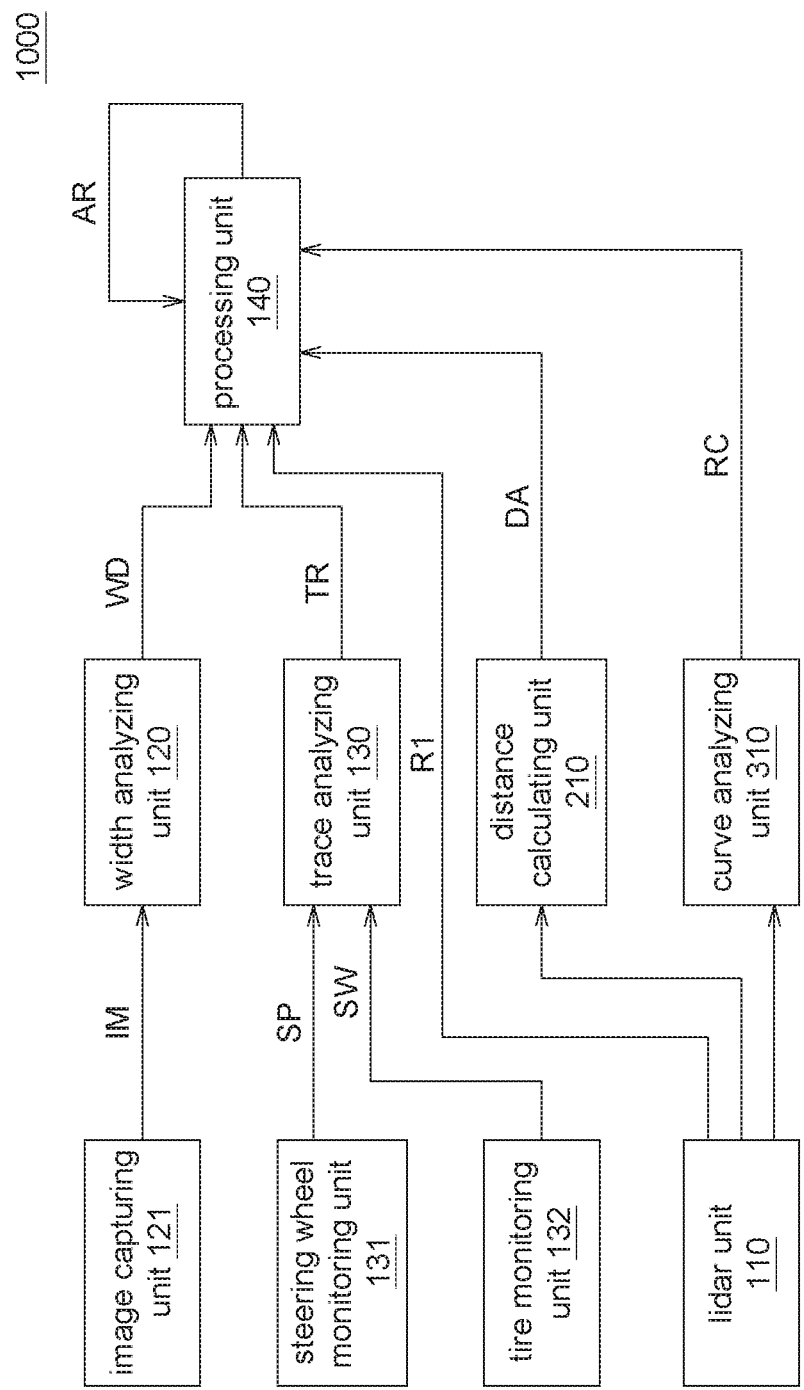

FIG. 1 shows a block diagram of a vehicle detection assisting system.

Figure 2:
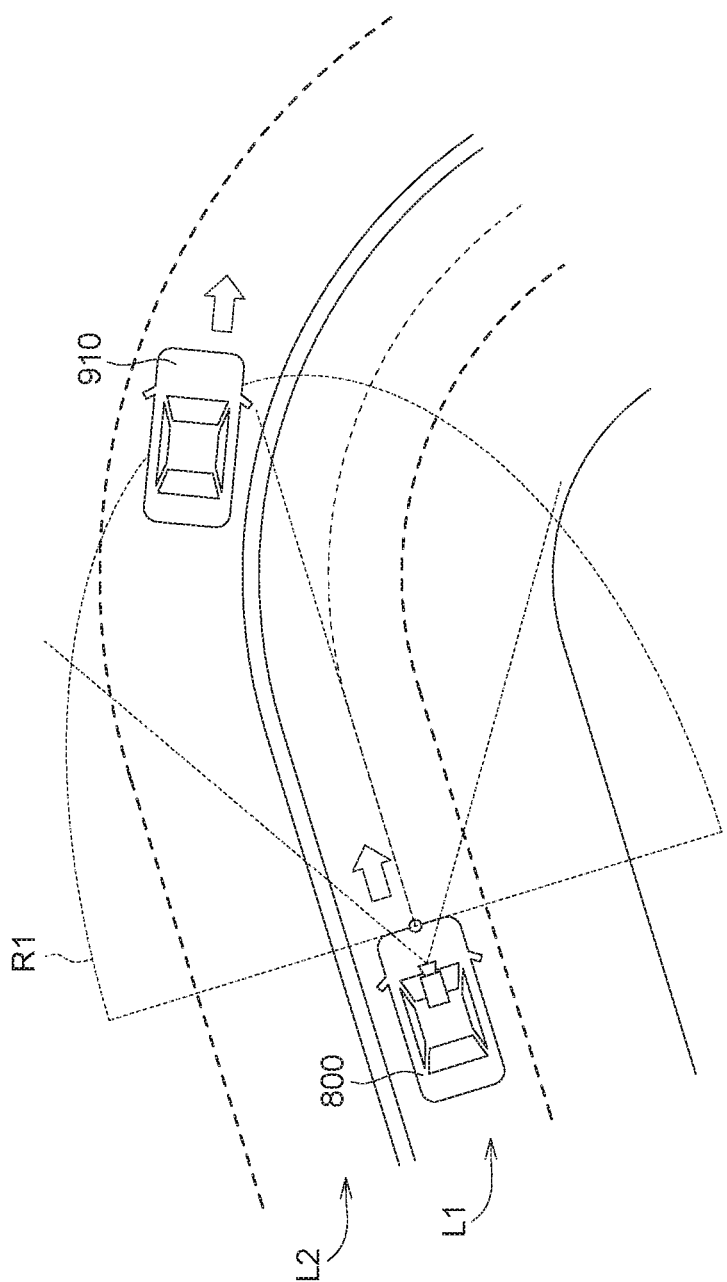

FIG. 2 shows a statue of a lane according to one embodiment.

Figure 3:
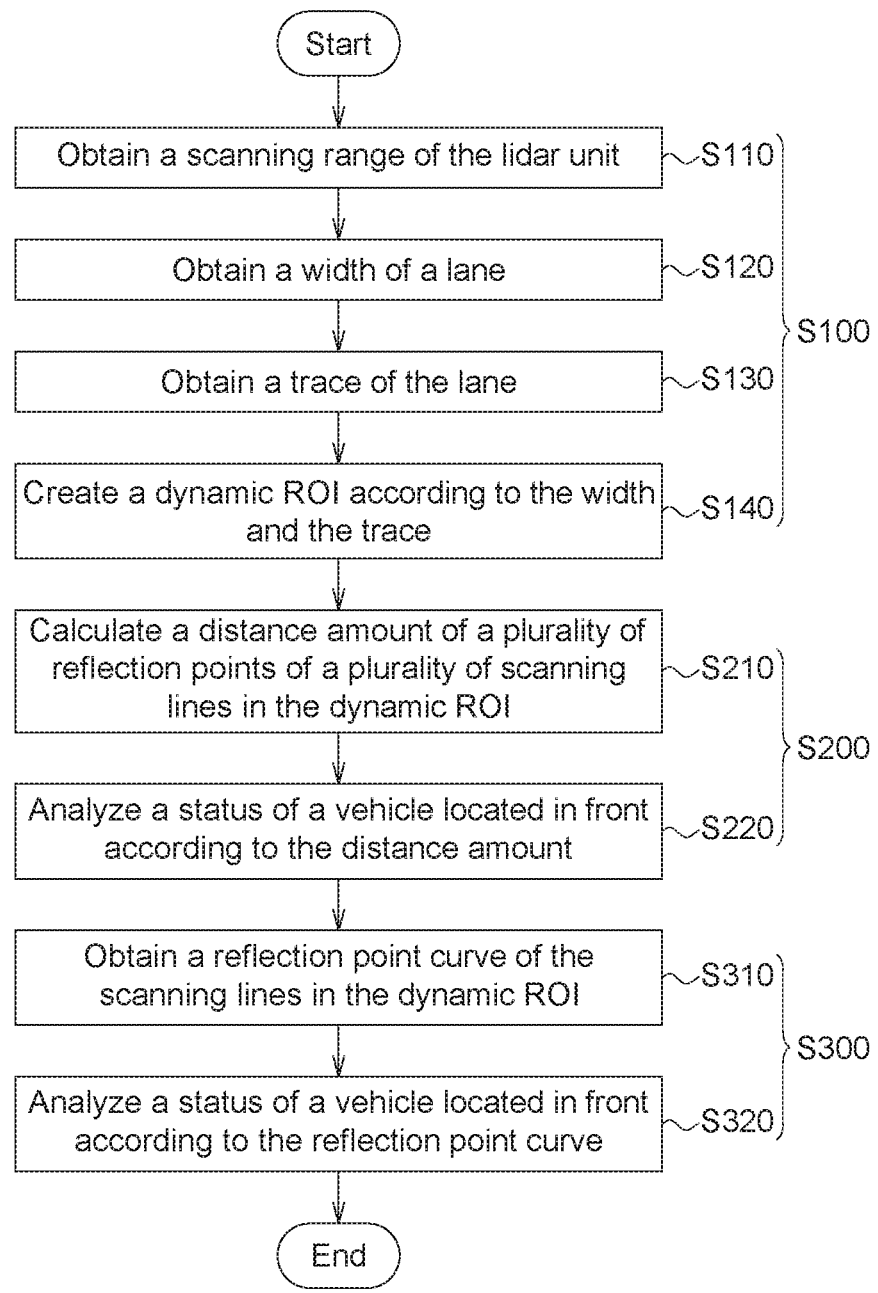
Figure 4:
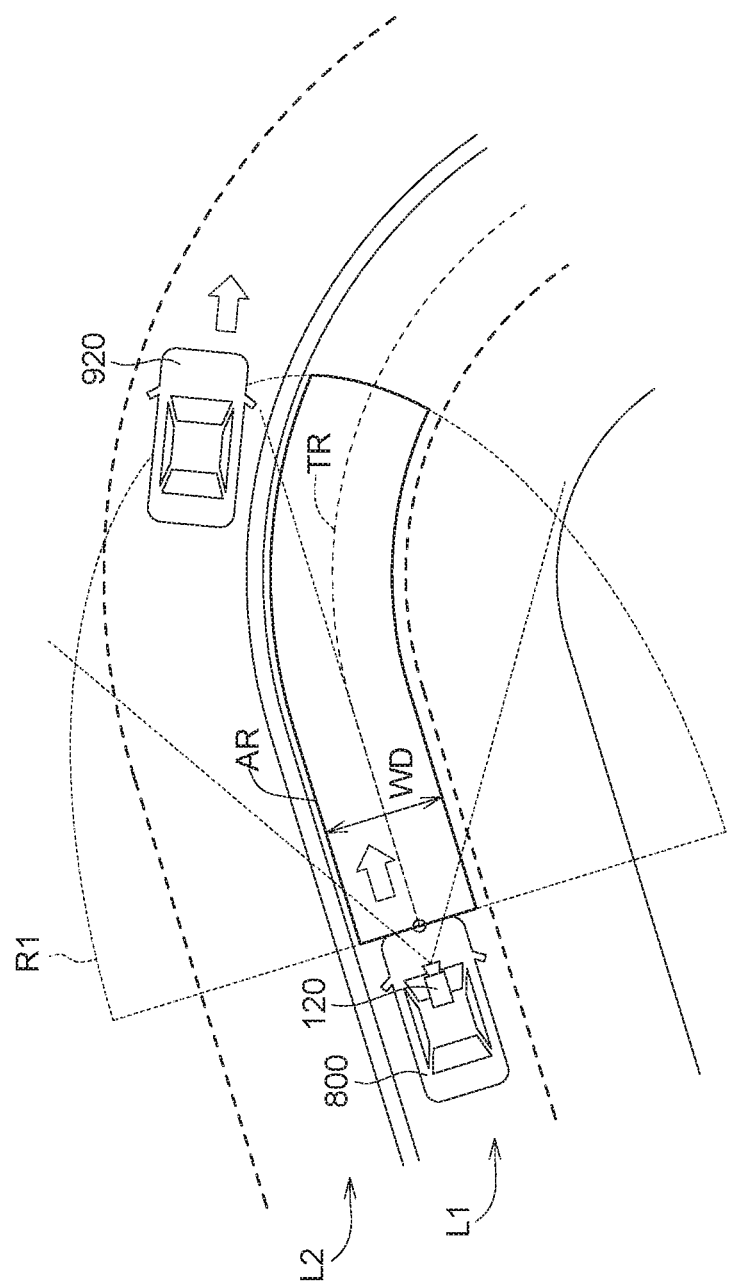
Figure 5:
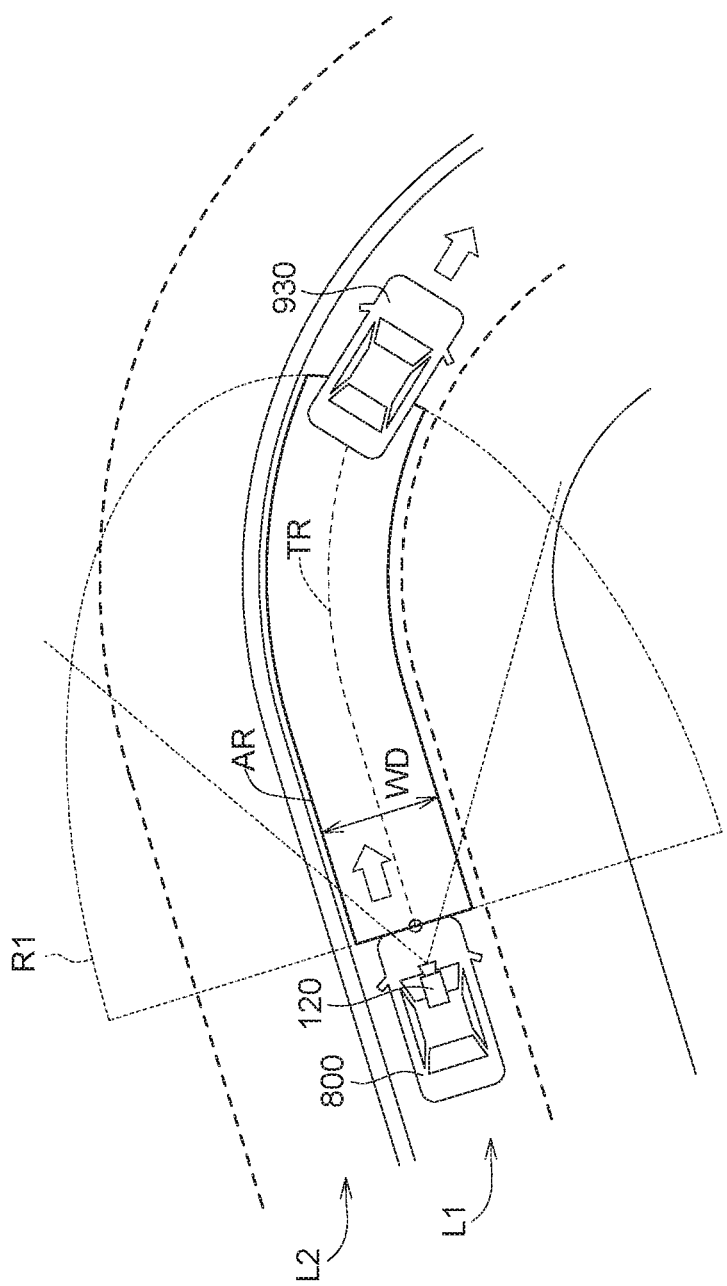

FIG. 3 shows a flowchart of a vehicle detecting method according to one embodiment FIGS. 4 to 5 show a status of the lane according to one embodiment.

Figure 6:
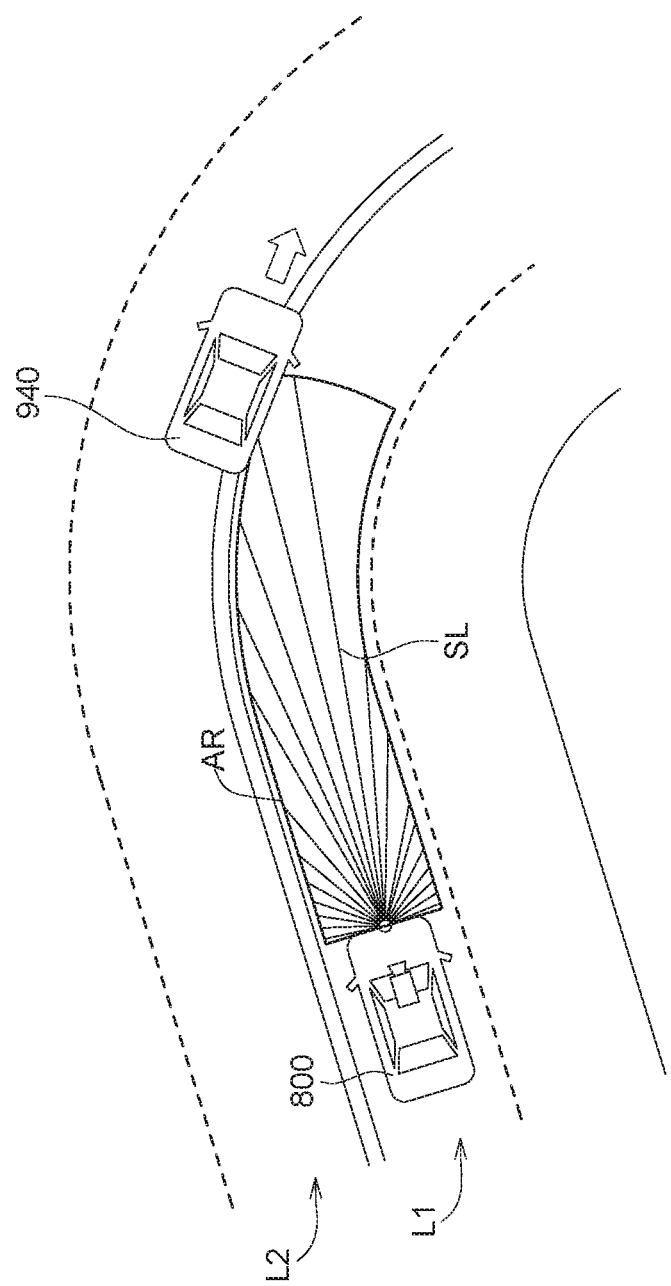
Figure 7:
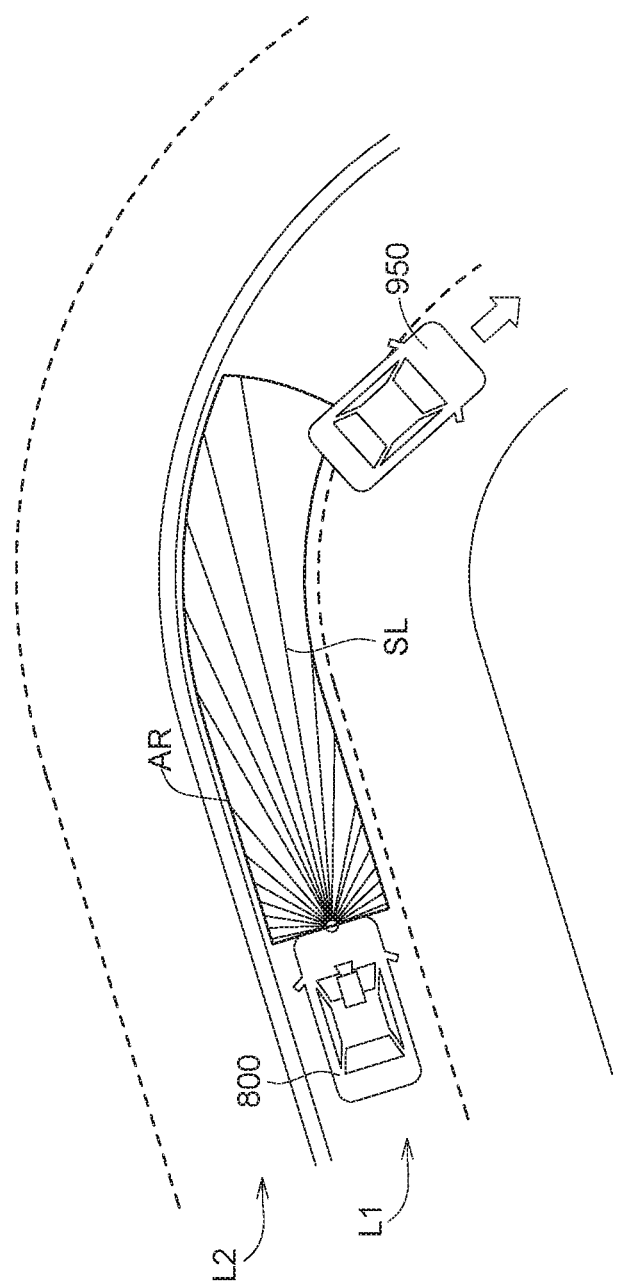
Figure 8:
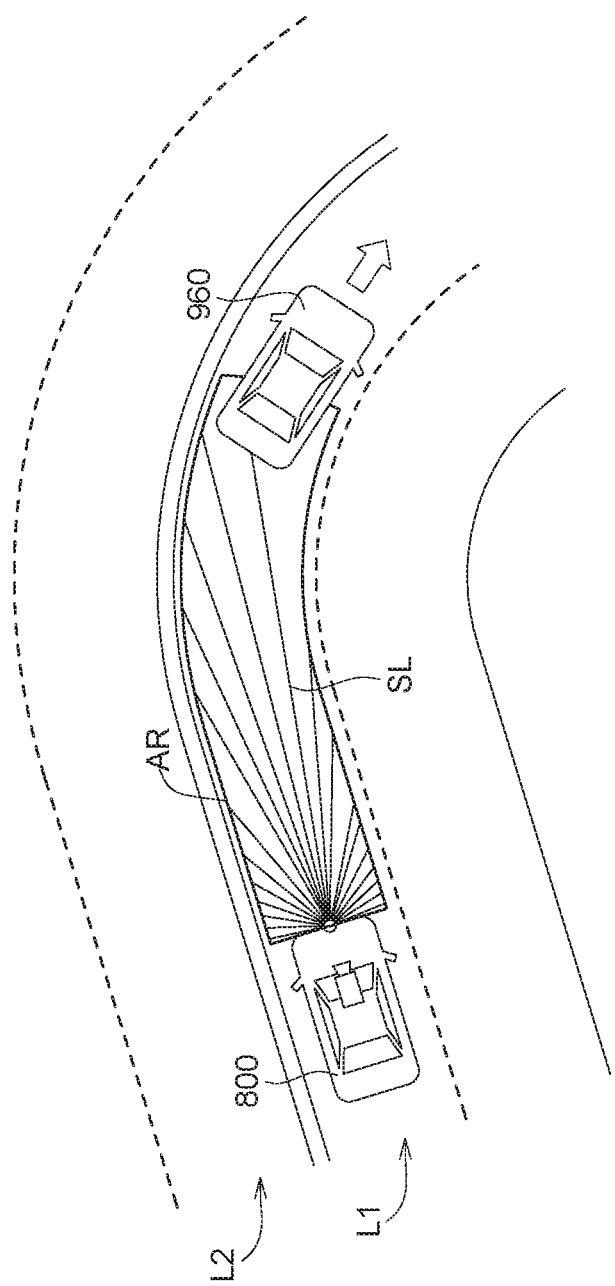

FIGS. 6 to 8 show a status of the lane according to another embodiment.

Figure 9:
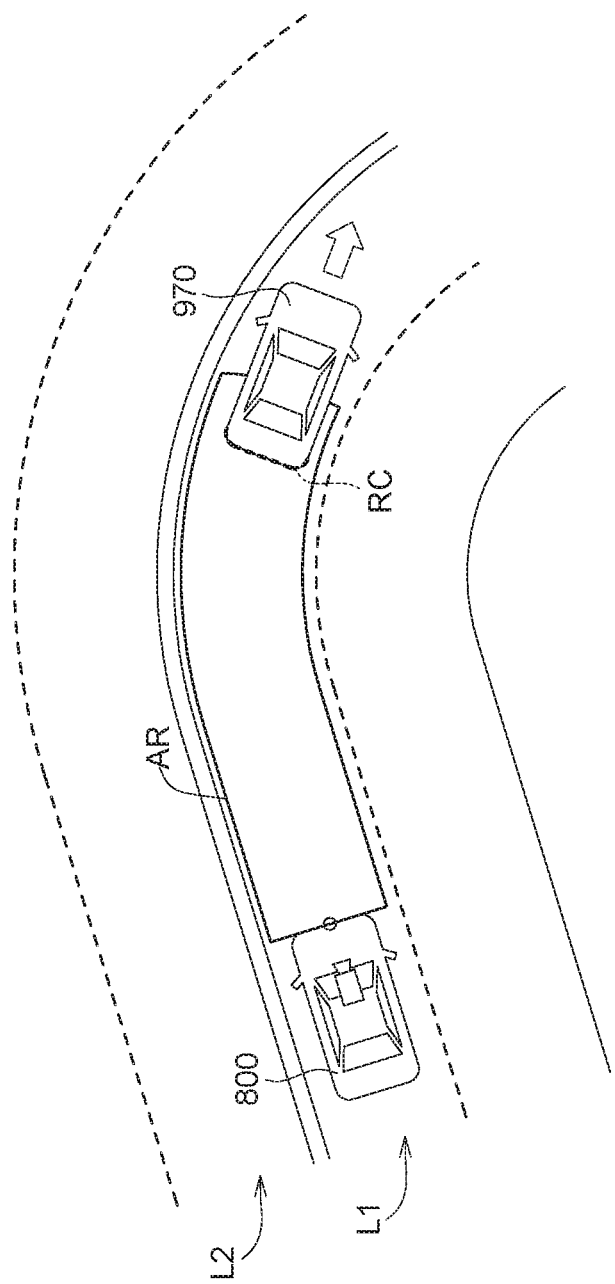
Figure 10:
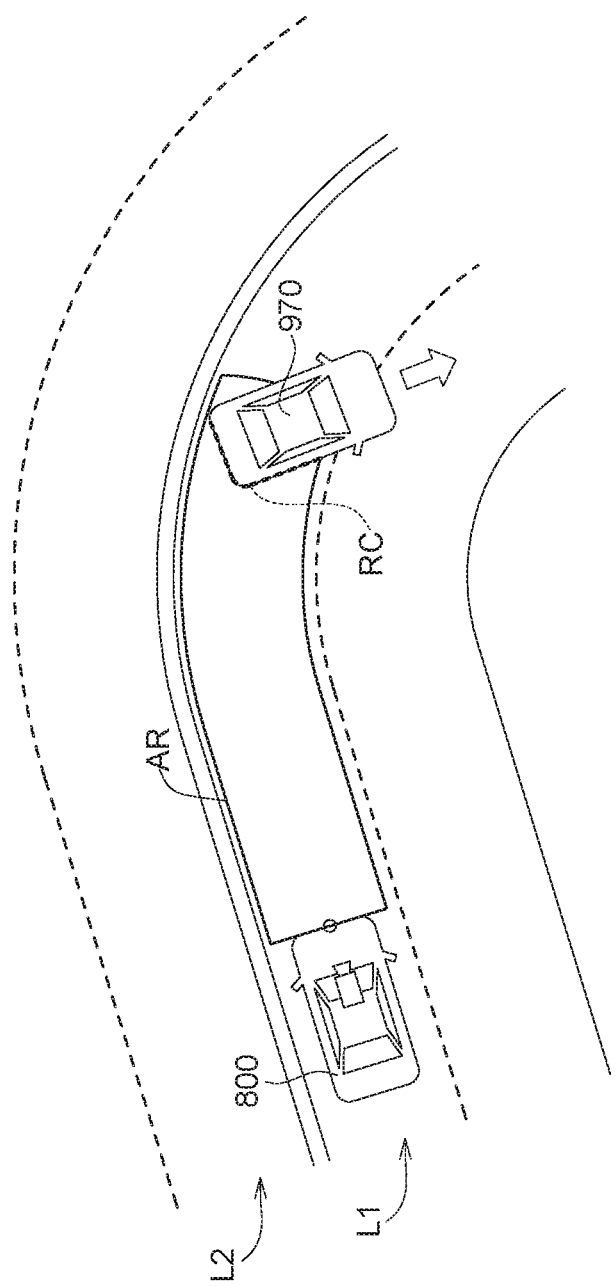

FIGS. 9 to 10 show a status of the lane according to another embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a block diagram of a vehicle detection assisting system 1000. The vehicle detection assisting system 1000 includes a lidar unit 110, a width analyzing unit 120, a trace analyzing unit 130, a processing unit 140, an image capturing unit 121, a steering wheel monitoring unit 131, a tire monitoring unit 132, a distance calculating unit 210 and a curve analyzing unit 310. For example, the vehicle detection assisting system 1000 may be a computer system on a vehicle. The lidar unit 110 is used for emitting a lidar and receiving the reflected lidar. The lidar unit 110 scans the lane by fan scanning. By performing the scanning of the lidar unit 110, whether a vehicle is located in front and the distance of this vehicle can be detected.

Please refer to FIG. 2, which shows a statue of a lane according to one embodiment. As shown in FIG. 2, the lidar unit 110 on the vehicle 800 scans the lane, and a vehicle 910 in a scanning region R1 is detected. Although the vehicle 910 is located in front of the vehicle 800, the vehicle 910 does not drive on the lane L1 where the vehicle 800 drives. Actually, the vehicle 910 drives on another lane L2. Therefore, if the detection is performed on the scanning region R1, it is easy to misjudge the status of the lane.

In the present embodiment, the width analyzing unit 120, the trace analyzing unit 130 and the processing unit 140 are used to create a dynamic region of interest (dynamic ROI) AR (shown in FIGS. 4 and 5). Each of the width analyzing unit 120, the trace analyzing unit 130 and the processing unit 140 may be a chip, a circuit, a storage device storing a plurality of program codes. A flowchart is used to illustrate the operation of those elements. For example, the image capturing unit 121 may be a photo camera or a video camera. Each of the steering wheel monitoring unit 131 and the tire monitoring unit 132 may be a rotating detector. Please refer to FIGS. 3 to 5, FIG. 3 shows a flowchart of a vehicle detecting method according to one embodiment, FIGS. 4 to 5 show a status of the lane according to one embodiment. The vehicle detecting method in FIG. 3 includes steps S100, S200 and S300. The step S100 is a procedure for creating the dynamic ROI AR. The step S200 is a procedure for determining the location of the vehicle located in front. The step S300 is a procedure for detecting the movement of the vehicle located in front. In one embodiment, the step S200 can be omitted, and the vehicle detecting method includes steps S100, S300 only. Or, in another embodiment, the step S300 can be omitted, and the vehicle detecting method includes the steps S100, S200 only. Or, in another embodiment, the steps S200, S300 can be omitted, and the vehicle detecting method includes the step S100 only.

The step S100 includes steps S110 to S140. In step S110, the processing unit 140 obtains the scanning region R1 from the lidar unit 110. For example, the scanning region R1 may be a fan area having a particular scanning angle and a particular scanning radius.

In the step S120, the width analyzing unit 120 obtains a width WD of the lane L1. In one embodiment, the width analyzing unit 120 obtains the width WD according to an image IM captured by the image capturing unit 121. For example, the width analyzing unit 120 can identify two marking lines on the image IM first. Then, the width analyzing unit 120 calculates the width WD of the lane L1 according to the ratio of the width of the vehicle 800 to the distance of the two marking lines. Or, in another embodiment, the width analyzing unit 120 can obtain the width WD by reading a map information at the location of the vehicle 800.

In the step S130, the trace analyzing unit 130 obtains a trace TR of the lane L1. In one embodiment, the trace analyzing unit 130 can obtain the trace TR according to a steering wheel information SW detected by the steering wheel monitoring unit 131 and a speed information SP detected by the steering wheel information SW. The vehicle 800 drives along the trace TR. As shown in FIG. 4, when the vehicle 800 drives on the curved lane L1, the trace TR is curve shaped. In another, the trace analyzing unit 130 may obtain the trace TR by reading a map information at the location of the vehicle 800.

The performing order of the steps S110, S120, S130 is not limited as shown in FIG. 3. In one embodiment, the step S110, S120, S130 can be performed at the same time.

In the step S140, the processing unit 140 creates the dynamic ROI AR in the scanning region R1 according to the width WD and the trace TR. In one embodiment, the dynamic ROI AR is a range which extends along the trace TR with the width WD. The dynamic ROI AR is an overlapping range between the lane L1 and the scanning region R1.

As shown in FIG. 4, the vehicle 920 is located right ahead the vehicle 800, but the vehicle 920 is not located in the dynamic ROI AR. So, the processing unit 140 determines that the vehicle 920 is not located at the lane L1 where the vehicle 800 drives. Therefore, any curved lane will not cause the detection error.

As shown in FIG. 5, the vehicle 930 is not located right ahead the vehicle 800, but the vehicle 930 is located in the dynamic ROI AR. So, the processing unit 140 determines that the vehicle 930 is located at the lane L1 where the vehicle 800 drives.

As such, by using the dynamic ROI AR, even if the lane L1 is curved, the detection of the status of the vehicle 930 is correct.

Moreover, the area of the dynamic ROI AR is smaller than the area of the scanning region R1, and the detection on the region outside the dynamic ROI AR is omitted. As such, the processing loading can be reduced.

Please refer to FIG. 1. By using the distance calculating unit 210, whether a vehicle in the dynamic ROI AR drives on the lane L1 can be correctly detected. For example, the distance calculating unit 210 can be a chip, a circuit or a storage device storing a plurality of program codes. The operation of the distance calculating unit 210 is illustrated by the flowchart in FIG. 3 and FIGS. 6 to 8. FIGS. 6 to 8 show a status of the lane according to another embodiment.

After the dynamic ROI AR is created in the step S140, the process proceeds to the step S200. The step S200 includes steps S210, S220. In the step S210, the distance calculating unit 210 calculates a distance amount DA of a plurality of reflection points of a plurality of scanning lines SL in the dynamic ROI AR. The distance amount DA can represent the status of an object located in the dynamic ROI AR. The lower the distance amount DA is, the larger the region in the dynamic ROI AR occupied by the object is.

In the step S220, the processing unit 140 analyzes the status of a vehicle located in front according to the distance amount DA. As shown in FIG. 6, the vehicle 940 occupies part of the dynamic ROI AR, because the vehicle 940 is turning and part of the lane L1 is occupied. The distance amount DA is not lower than a predetermined value, so the processing unit 140 deems that the vehicle 940 does not drive on the lane L1.

As shown in FIG. 7, the vehicle 950 occupies part of the dynamic ROI AR, because the vehicle 950 is turning and part of the lane L1 is occupied. The distance amount DA is not lower than the predetermined value, so the processing unit 140 deems that the vehicle 950 does not drive on the lane L1.

As shown in FIG. 8, the vehicle 960 occupies a large part of the dynamic ROI AR. The distance amount DA is lower than the predetermined value, so the processing unit 140 deems that the vehicle 960 drives on the lane L1. As such, according to the distance amount DA, whether the vehicle drives on the lane L1 can be correctly determined to improve the accuracy of detection.

Please refer to FIG. 1. By using the curve analyzing unit 310, whether a vehicle located in front leaves the lane L1 can be correctly determined. For example, the curve analyzing unit 310 may be a chip, a circuit or a storage device storing a program codes. The operation of the curve analyzing unit 310 is illustrated by the flowchart in FIG. 3 and FIGS. 9 to 10. FIGS. 9 to 10 show the status of the lane according to another embodiment.

The step S300 includes steps S310 and S320. In step S310, the curve analyzing unit 310 obtains a reflection point curve RC of the scanning lines SL (shown in FIGS. 6 to 8) in the dynamic ROI AR. The reflection point curve RC can represent the rear of the vehicle 970. When the vehicle 970 changes lane, the reflection point curve RC will significantly change.

In step S320, the processing unit 140 analyzes the status of the vehicle 970 according to the reflection point curve RC. As shown in FIGS. 9 to 10, the length of the reflection point curve RC significantly changes (becomes large). The processing unit 140 deems that the vehicle 970 located in front is leaving the lane L1.

According to the embodiments described above, the dynamic ROI is used to assist the detection of the vehicle, such that even if the lane is curved, whether the vehicle drives on the lane and whether the vehicle leaves the lane can be correctly determined to improve the driving safety.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A vehicle detection assisting method, comprising:
   obtaining a scanning range of a lidar unit;
   obtaining a width of a lane;
   obtaining a trace of the lane;
   creating a dynamic region of interest (dynamic ROI) in the scanning range according to the width and the trace;
   calculating a distance amount of a plurality of reflection points of a plurality of scanning lines of the lidar unit in the dynamic ROI; and
   analyzing a status of a vehicle located in front according to the distance amount, wherein if a first vehicle is located in front and is in the dynamic ROI, it is determined that the first vehicle is located at the lane; if a second vehicle is located in front but is not in the dynamic ROI, it is determined that the second vehicle is not located at the lane.

2. The vehicle detection assisting method according to claim 1, wherein in the step of obtaining the width of the lane, the width of the lane is obtained according to an image.

3. The vehicle detection assisting method according to claim 1, wherein in the step of obtaining the width of the lane, the width of the lane is obtained according to a map information.

4. The vehicle detection assisting method according to claim 1, wherein in the step of obtaining the trace of the lane, the trace is obtained according to a steering wheel information and a speed information.

5. The vehicle detection assisting method according to claim 1, wherein in the step of obtaining the trace of the lane, the trace is obtained according to a map information.

6. The vehicle detection assisting method according to claim 1, wherein in the step of analyzing the status of the vehicle located in front according to the distance amount, whether the vehicle located in front drives on the lane is determined.

7. The vehicle detection assisting method according to claim 1, further comprising:
   obtaining a reflection point curve of a plurality of scanning lines of the lidar unit in the dynamic ROI; and
   analyzing a status of a vehicle located in front according to the reflection point curve.

8. The vehicle detection assisting method according to claim 7, wherein in the step of analyzing the status of the vehicle located in front according to the reflection point curve, the status of the vehicle located in front is analyzed according to a change of a length of the reflection point curve.

9. The vehicle detection assisting method according to claim 7, wherein in the step of analyzing the status of the vehicle located in front according to the reflection point curve, whether the vehicle located in front leaves the lane is determined.

10. A vehicle detection assisting system, comprising:
    a lidar unit for emitting a plurality of scanning lines, wherein the lidar unit has a scanning range;
    a width analyzing unit for obtaining a width of a lane;
    a trace analyzing unit for obtaining a trace of the lane;
    a processing unit for creating a dynamic region of interest (dynamic ROI) in the scanning range according to the width and the trace; and
    a distance calculating unit for calculating a distance amount of a plurality of reflection points of the scanning lines in the dynamic ROI, wherein the processing unit analyzes a status of a vehicle located in front according to the distance amount; if a first vehicle is located in front and is in the dynamic ROI, it is determined that the first vehicle is located at the lane; if a second vehicle is located in front but is not in the dynamic ROI, it is determined that the second vehicle is not located at the lane.

11. The vehicle detection assisting system according to claim 10, further comprising:
    an image capturing unit for capturing an image, wherein the width analyzing unit obtains the width according to the image.

12. The vehicle detection assisting system according to claim 10, wherein the width analyzing unit obtains the width according to a map information.

13. The vehicle detection assisting system according to claim 10, further comprising:
    a steering wheel monitoring unit for detecting a steering wheel information; and
    a tire monitoring unit for detecting a speed information, wherein the trace analyzing unit obtains the trace according to the steering wheel information and the speed information.

14. The vehicle detection assisting system according to claim 10, wherein the trace analyzing unit obtains the trace according to a map information.

15. The vehicle detection assisting system according to claim 10, wherein the process unit determines whether the vehicle located in front drives on the lane.

16. The vehicle detection assisting system according to claim 10, further comprising:
    a curve analyzing unit for obtaining a reflection point curve of the scanning lines in the dynamic ROI, wherein the processing unit analyzes a status of a vehicle located in front according to the reflection point curve.

17. The vehicle detection assisting system according to claim 16, wherein the processing unit analyzes the status of the vehicle located in front according to a change of a length of the reflection point curve.

18. The vehicle detection assisting system according to claim 16, wherein the processing unit determines whether the vehicle located in front leaves the lane.

* * * * *